April 11, 1939.  M. C. MAGARIAN  2,153,634
SIGNALING ARM
Filed Nov. 16, 1937
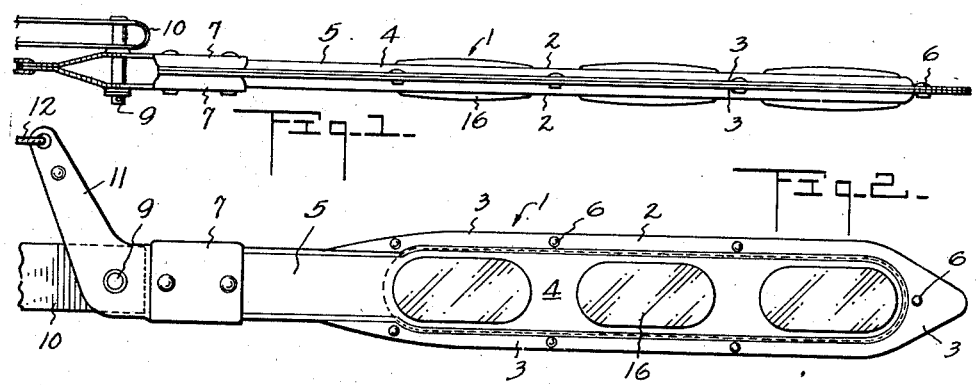
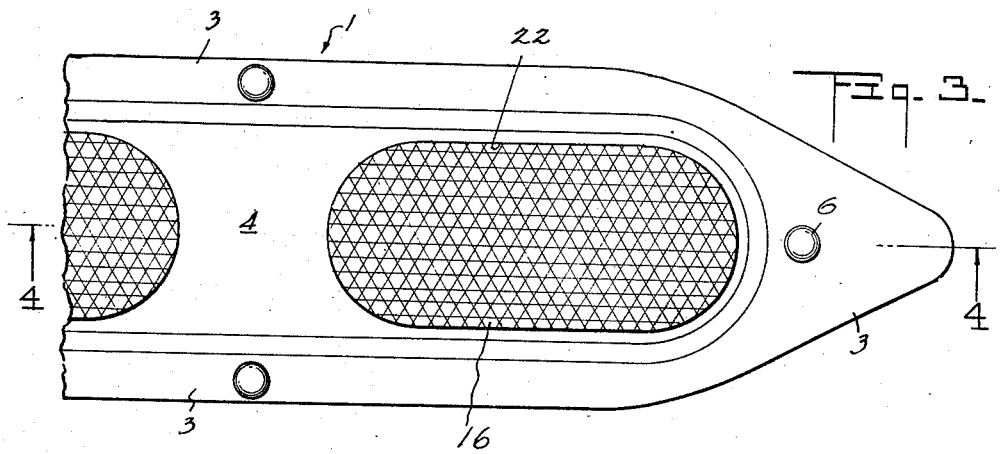
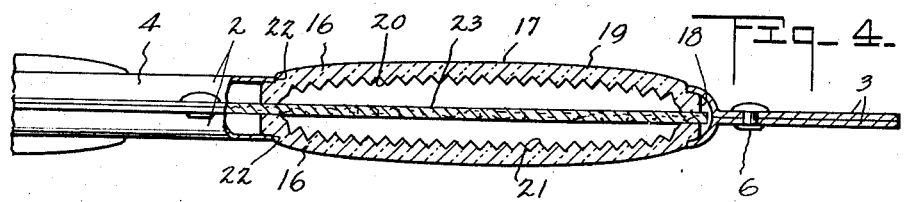
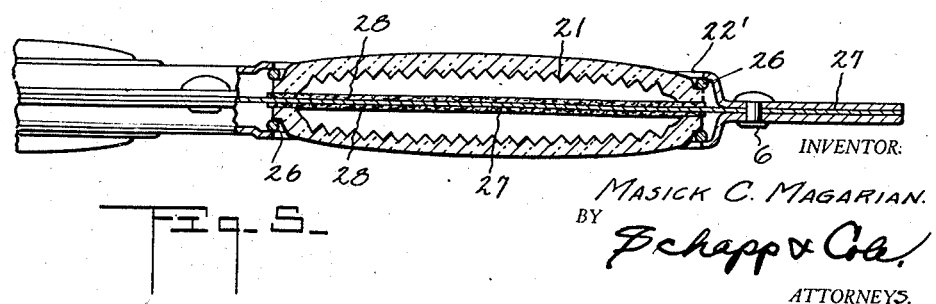
INVENTOR:
MASICK C. MAGARIAN.
BY Schapp & Cole
ATTORNEYS.

Patented Apr. 11, 1939

2,153,634

UNITED STATES PATENT OFFICE 2,153,634

SIGNALING ARM

Masick C. Magarian, Fresno, Calif.

Application November 16, 1937, Serial No. 174,801

4 Claims. (Cl. 88—81)

The present invention relates to improvements in signaling arms for direction indicators and the like, and its principal object is to provide a signaling arm that is particularly efficient in attracting the attention and in giving information of proposed changes in the direction or speed of travel of a motor vehicle.

A further object of the invention is to provide a signaling arm that will be equally effective in day driving and night driving.

In the furtherance of these objects it is proposed to use reflecting lenses in combination with a signaling arm and to arrange a plurality of lenses on an arm in such a manner that the lenses form a line coinciding with the line formed by the arm so that the lenses serve to accentuate the directional information given by a particular position of the arm.

It is further proposed to use lenses which of themselves are of a shape elongated in the general direction of the arm so as to aid in conveying directional information.

It is further proposed to use lenses of a shape and construction particularly adapted to reflect rays in many directions so that the intended signal may be conveyed to drivers of other vehicles approaching at different angles.

And finally it is proposed to provide a signaling arm of simple construction, of attractive appearance and one that looks exactly the same whether viewed from in front or from the rear.

Further objects and advantages of my invention will appear as the specification proceeds.

The preferred forms of my invention are illustrated in the accompanying drawing, in which Figure 1 shows a top plan view of my signaling arm as attached to a support;

Figure 2 a front view of the same with part of a supporting element;

Figure 3 an enlarged detail view of the outer portion of the arm;

Figure 4 a section taken along line 4—4 of Figure 3, and

Figure 5 a similar section illustrating a modified form of my invention.

While I have shown only the preferred forms of my invention, I wish to have it understood that various changes or modification may be made within the scope of the claims hereto attached without departing from the spirit of the invention.

In its preferred form my signaling arm 1 comprises a pair of complementary plates 2 of identical construction, each having a flange 3 along its upper, outer and lower edge and a body portion 4 set off relative to the flange but substantially parallel thereto, the body portion extending inwardly beyond the flange as shown at 5.

The two plates, when placed in assembled relation, register completely with the flanges 3 disposed in immediately adjacent relation and secured together, by rivets 6 or by spot-welding or other suitable means, and the body sections forming a hollow body which extends inwardly beyond the flanges.

The inward end is clampingly engaged by the two jaws 7 of a bracket which is pivotally mounted upon the pin 9 of a supporting member 10 and forms an operating finger 11. To the outer end of the latter a cable 12 or other operating means is attached, by means of which the arm may be thrown into any one of the conventional direction indicating signals, an upward slant indicating a turn to the right, a horizontal position a turn to the left and a downward slant a slowing down of the vehicle.

The pivot 9 is preferably mounted relative to the vehicle in such a manner that when the arm hangs straight down it is out of sight for drivers of other vehicles approaching from the rear.

It will be noted that the real signaling portion of the arm is spaced a considerable distance from the supporting pivot which causes the signaling portion, when thrown into active position, to easily clear a portion of the vehicle normally hiding it.

The signaling or outer portion of the arm is constructed to display a plurality of reflecting lenses 16 which are preferably made substantially oval or elliptical in shape and which are arranged with their long axes alined and running in the same direction as the arm.

Each of these reflectors comprises a substantially concavo-convex body portion 17 and a flat flange 18. The convex face 19 of the body portion which forms the outer face, is smooth and the concave or inner face 20 is broken to present a large number of pyramidal projections 21 particularly adapted for reflecting light rays back substantially in the same direction from which they came. This inner face is silver-coated to prevent light rays from passing through.

The reflectors are arranged in pairs as shown in Figures 4 and 5 so that the reflectors on the front side are made to register with those on the rear side. They are accommodated in openings 22 in the plates, which in the form shown in Figures 1-4 are the same size as the body portions of the reflectors. The latter are arranged in such a manner that the flanges bear on the margins of the openings from the inside while the body portions project through the openings and bulge outwardly sufficiently far to be visible to a person even when looking at the signaling arm in edge view, as clearly appears from Figure 1 and Figure 4.

Between the lenses I interpose a separator 23 and the different parts are arranged and dimensioned so that when assembled the marginal portions of the body sections of the plates bear on the flanges of the lenses and clamp the same from opposite sides upon the separator.

The signaling arm of the form shown in Figures 1-4 is preferably assembled as follows: One of the two plates 2 is laid on a suitable support with its concave face presented upwardly. Next the lenses intended for this plate are placed in position in the plate openings, as in Figure 4. The separator, which may be flexible and impervious to light rays, and which is preferably made of tar paper or cork, is placed on top of the lenses.

Next the opposite lenses are placed to register with the lower lenses, whereupon the second plate is applied and suitably secured to the first plate by rivets or otherwise. Any slight inaccuracies in the placing of the lenses will be automatically adjusted by the assembling of the plates since the openings in the latter fit closely around the body portions of the former.

Where this form is selected, the lenses cannot be removed or replaced without taking the plates apart. Where removability is desired the form shown in Figure 5 may be used. In this form the plate openings 22' are substantially coextensive with the outer dimensions of the lens flanges so that the latter may be introduced from the outside without taking the plates apart. The lenses are held in position by split rings 26 and in this form I preferably use a rigid separator 27 between the two sides of the signaling arm so that each lens has independent support. Suitable gaskets 28 are introduced between the rigid separator and the lenses.

The metallic part of the signaling arm and the lenses are preferably made in contrasting colors, both of which have a high degree of visibility at night time as well as in the day time. In the preferred form, I paint the metallic parts a pure white and make the lenses of amber color.

A signaling arm of this character has a high degree of efficiency and not only is plainly visible whenever displayed for signaling purposes, but also positively attracts attention through the light effects produced by the lenses, their particular construction and their position on the arm.

I claim:

1. In a lens mounting for a signal arm, two identical elongated plates having registering marginal flanges and spaced body portions with registering openings therein, lenses having flanges bearing upon the inner margins of the openings and having body portions projecting through the latter, a separator between the lenses and means for securing the flanges of the plates together whereby the body portions of the plates are made to clamp the lenses upon the separator, the lenses having shaped inner faces to produce desired reflecting effects and the separator serving to prevent play between the lenses and the plates.

2. In a direction indicator, an elongated indicating arm having parallel upper and lower edges and comprising a pair of elongated plates arranged face to face and having marginal upper and lower flanges, the body sections of the plates being offset relative to the flanges to define a lens-receiving space having parallel upper and lower edges, the body sections having openings therein to expose lenses mounted in said space and being made to extend beyond one end of the marginal flanges and a pair of flat clamps engaging said projecting end and enveloping the same so as to substantially merge into the contour thereof, the faces of the body sections being substantially parallel to one another throughout their length.

3. In a direction indicator, a signal arm comprising a pair of elongated plates arranged face to face and having marginal flanges, the body sections of the plates being offset to define an elongated lens-receiving space. each of the body sections having an alined series of openings therein registering with those of the other, lenses mounted in the openings of each body section and having flanges bearing on the inner faces thereof and a common separator for spacing opposing lenses, the separator being coextensive with the lens-receiving space to facilitate positioning of the same during assembly.

4. In a direction indicator, a signal arm comprising a pair of elongated plates arranged face to face and having marginal flanges, the body sections of the plates being offset to define an elongated lens-receiving space, each of the body sections having an alined series of openings therein registering with those of the other, lenses mounted in the openings of each body section and having flanges bearing on the inner faces thereof and a common separator for spacing opposing lenses, the separator being coextensive with the lens-receiving space to facilitate positioning of the same during assembly and the faces of the body sections being parallel so as to exert uniform pressure on the interposed lenses and the separator.

MASICK C. MAGARIAN.